United States Patent
Styles (10) Patent No.: US 7,830,375 B2
(45) Date of Patent: Nov. 9, 2010

(54) CONSTRAINT SCHEMES FOR COMPUTER SIMULATION OF CLOTH AND OTHER MATERIALS

(75) Inventor: Andrew Graham Styles, San Diego, CA (US)

(73) Assignee: Sony Computer Entertainment America Inc., Foster City, CA (US)

( * ) Notice: Subject to any disclaimer, the term of this patent is extended or adjusted under 35 U.S.C. 154(b) by 0 days.

(21) Appl. No.: 12/268,871

(22) Filed: Nov. 11, 2008

(65) Prior Publication Data

US 2009/0066703 A1    Mar. 12, 2009

Related U.S. Application Data

(63) Continuation of application No. 11/195,399, filed on Aug. 2, 2005, now Pat. No. 7,463,265.

(51) Int. Cl.
    *G06T 15/00* (2006.01)
(52) U.S. Cl. .................. 345/419; 345/473; 345/474; 345/475
(58) Field of Classification Search .................. 345/473, 345/474, 475, 419
    See application file for complete search history.

(56) References Cited

U.S. PATENT DOCUMENTS

| | | | |
|---|---|---|---|
| 5,504,845 | A | 4/1996 | Vecchione |
| 6,476,804 | B1 | 11/2002 | Costabel |
| 6,532,014 | B1 | 3/2003 | Xu et al. |
| 6,608,631 | B1 | 8/2003 | Milliron |
| 6,909,431 | B1 | 6/2005 | Anderson et al. |
| 6,967,658 | B2 | 11/2005 | Hunter et al. |
| 6,970,171 | B2 | 11/2005 | Baraff et al. |
| 7,091,977 | B2 | 8/2006 | Jeong et al. |
| 7,206,729 | B2 * | 4/2007 | Baraff et al. ................ 703/7 |
| 7,209,139 | B1 | 4/2007 | Keet et al. |
| 7,298,374 | B2 * | 11/2007 | Styles ...................... 345/473 |

(Continued)

OTHER PUBLICATIONS

Igarashi et al., Clothing Manipulation, SIGCHI—ACM, pp. 91-100, 2002.*

(Continued)

*Primary Examiner*—Phu Nguyen
(74) *Attorney, Agent, or Firm*—Fitch, Even, Tabin & Flannery (57) ABSTRACT

Constraint schemes for use in the computer simulation and animation of cloth, clothing and other materials helps to prevent clothing from excessive stretching, bunching up in unwanted areas, or "passing through" rigid objects during collisions. Several types of constraint systems are employed, including the use of skinned vertices as constraints and axial constraints. In these schemes cloth simulated vertices are generated for the material using a cloth simulation technique, and skinned vertices are generated for the material using a skin simulation technique. One or more of the cloth simulated vertices are compared to the corresponding skinned vertices. The cloth simulated vertices are modified if they deviate from the corresponding skinned vertices by more than a certain amount. Vertical constraints are also employed, which involve generating a first set of vertices for the material using a cloth simulation technique, comparing a vertical component of each of the first set of vertices to a lower limit for each of the first set of vertices, and for each vertical component that falls below the lower limit, modifying the vertical component to be equal to the lower limit.

20 Claims, 6 Drawing Sheets

U.S. PATENT DOCUMENTS

| | | | | |
|---|---|---|---|---|
| 7,333,112 | B2* | 2/2008 | Anderson | 345/473 |
| 7,385,601 | B2* | 6/2008 | Bingham et al. | 345/420 |
| 7,385,603 | B2 | 6/2008 | Piponi | |
| 7,463,265 | B2* | 12/2008 | Styles | 345/473 |
| 7,479,957 | B2* | 1/2009 | Li et al. | 345/419 |
| 7,570,264 | B2* | 8/2009 | Anderson | 345/473 |
| 7,652,670 | B2* | 1/2010 | Styles | 345/473 |
| 2005/0168460 | A1 | 8/2005 | Razdan et al. | |
| 2007/0030266 | A1 | 2/2007 | Styles | |
| 2007/0182744 | A1 | 8/2007 | Styles | |

OTHER PUBLICATIONS

Bridson et al., Simulation of clothing with folds and wrinkles, ACM SIGGRAPH, 2003, pp. 1-10.*

Cordier et al, Intergrating Deformations between Bodies and Cloths, The Journal of Visualization and Computer Animation, 2001, pp. 45-53.*

Jakobsen, Thomas; "Advanced Character Physics;" Gama Network Presents: Gamasutra.com; CMP Media Inc.; Jan. 21, 2003; pp. 1-17; (http://www.gamasutra.com/resource_guide/20030121/jacobson_01.shtml).

Malzbender, Tom et al.; "Polynomial Texture Maps;" presented at the Siggraph 2001 proceedings; May 15, 2001; pp. 1-10; (http://www.hpl.hp.com/research/ptm/papers/ptm.pdf).

Malzbender, Tom et al.; "Polynomial Texture Mapping (PTM);" Hewlett-Packard Laboratories; Research; pp. 1-2; 2001; http://www.hpl.hp.com/cig-bin/printer-friendly.cgi.

* cited by examiner

CONSTRAINT SCHEMES FOR COMPUTER SIMULATION OF CLOTH AND OTHER MATERIALS

CROSS-REFERENCE TO RELATED APPLICATIONS

This application is a continuation of U.S. patent application Ser. No. 11/195,399, filed on Aug. 2, 2005, entitled "CONSTRAINT SCHEMES FOR COMPUTER SIMULATION OF CLOTH AND OTHER MATERIALS," the entire disclosure of which, including the computer program listing appendix submitted therewith on compact disc, is hereby fully incorporated by reference herein in its entirety.

REFERENCE TO COMPUTER PROGRAM LISTING APPENDIX

The following computer program listing files that were submitted on a compact disc in the parent U.S. patent application Ser. No. 11/195,399, filed Aug. 2, 2005, and which are submitted herewith electronically with the filing of this application, are incorporated by reference herein in their entirety:

| NAME | CREATION DATE | SIZE (bytes) |
| --- | --- | --- |
| AxialConstraint.cpp | May 11, 2005 | 2,817 |
| AxialConstraint.h | May 11, 2005 | 928 |
| BondConstraint.cpp | May 11, 2005 | 2,583 |
| BondConstraint.h | May 11, 2005 | 1,044 |
| ClothInstance.cpp | May 27, 2005 | 13,690 |
| ClothInstance.h | May 11, 2005 | 2,839 |
| cloth-shaders.xml | May 31, 2005 | 5,705 |
| ClothTemplate.cpp | May 31, 2005 | 12,567 |
| ClothTemplate.h | May 27, 2005 | 3,109 |
| CollisionBody.cpp | May 11, 2005 | 5,410 |
| CollisionBody.h | May 11, 2005 | 2,231 |
| CylinderConstraint.cpp | Apr. 21, 2005 | 1,282 |
| CylinderConstraint.h | May 11, 2005 | 915 |
| JerseyInstance.cpp | May 11, 2005 | 303 |
| JerseyInstance.h | May 11, 2005 | 447 |
| JerseyTemplate.cpp | May 27, 2005 | 1,651 |
| JerseyTemplate.h | May 27, 2005 | 642 |
| PtxSystem.cpp | May 13, 2005 | 3,759 |
| PtxSystem.h | May 11, 2005 | 3,245 |
| ShortsInstance.cpp | May 11, 2005 | 1,732 |
| ShortsInstance.h | May 11, 2005 | 909 |
| ShortsTemplate.cpp | May 27, 2005 | 3,152 |
| ShortsTemplate.h | May 27, 2005 | 858 |
| Skeleton.cpp | Apr. 14, 2005 | 4,124 |
| Skeleton.h | May 11, 2005 | 2,184 |
| Vec3Array.cpp | May 13, 2005 | 525 |
| Vec3Array.h | May 11, 2005 | 1,697 |
| VertexConstraint.cpp | May 11, 2005 | 7,101 |
| VertexConstraint.h | May 11, 2005 | 3,475 |

BACKGROUND OF THE INVENTION

1. Field of the Invention

The present invention relates generally to computer graphics and animation, and more specifically to techniques for computer simulation of cloth and other materials.

2. Discussion of the Related Art

Computer animation, such as is used in computer entertainment video game systems, is becoming more and more realistic. While the simulation and modeling of rigid bodies is fairly advanced, the simulation and modeling of non-rigid bodies such as cloth and clothing is still developing. Cloth is generally more difficult to simulate than rigid bodies because cloth reacts differently to forces such as wind, gravity, collisions with rigid bodies, etc.

The paper "Advanced Character Physics" by Thomas Jakobsen, dated Jan. 21, 2003 (http://www.gamasutra.com/resource_guide/20030121/jacobson_01.shtml), which is incorporated by reference herein in its entirety, describes a Verlet integration scheme for cloth simulation. Verlet integration is a method of calculating classical physics in a way suitable to real-time simulations on computers. It is a method with more stability with larger steps in time than the equations usually used in Newtonian physics. It is most often used for molecular dynamics and real-time computer simulation of objects. A very similar method is often used as an optimized method of water ripple simulation It is with respect to these and other background information factors that the present invention has evolved.

SUMMARY OF THE INVENTION

One embodiment provides a method for use in simulation of a material, comprising: generating a first set of vertices for the material using a cloth simulation technique; and using skinned vertices as a constraint on the first set of vertices for the material.

Another embodiment provides a method for use in simulation of a material, comprising: generating a first set of vertices for the material using a first simulation technique; generating a second set of vertices for the material using a second simulation technique; and using the second set of vertices as a constraint on the first set of vertices.

Another embodiment provides a system, comprising: a processing unit; a memory coupled to the processing unit; and a display coupled to the processing unit; wherein the processing unit, memory, and display are configured to simulate a material and are further configured to generate a first set of vertices for the material using a cloth simulation technique and use skinned vertices as a constraint on the first set of vertices for the material.

Another embodiment provides a system, comprising: a processing unit; a memory coupled to the processing unit; and a display coupled to the processing unit; wherein the processing unit, memory, and display are configured to simulate a material and are further configured to generate a first set of vertices for the material using a first simulation technique, generate a second set of vertices for the material using a second simulation technique, and use the second set of vertices as a constraint on the first set of vertices.

Another embodiment provides a memory storing an application of a type executed by a system that includes a processor, the application adapted to cause the processor to execute steps comprising: generating a first set of vertices for a material using a cloth simulation technique; and using skinned vertices as a constraint on the first set of vertices for the material.

Another embodiment provides a memory storing an application of a type executed by a system that includes a processor, the application adapted to cause the processor to execute steps comprising: generating a first set of vertices for a material using a first simulation technique; generating a second set of vertices for the material using a second simulation technique; and using the second set of vertices as a constraint on the first set of vertices.

Another embodiment provides a method for use in simulation of a material, the method comprising: generating a first set of vertices for the material using a first simulation technique; comparing a vertical component of each of the first set of vertices to a lower limit for each of the first set of vertices; and for each vertical component that falls below the lower limit, modifying the vertical component.

Another embodiment provides a system, comprising: a processing unit; a memory coupled to the processing unit; and a display coupled to the processing unit; wherein the processing unit, memory, and display are configured to simulate a material and are further configured to generate a first set of vertices for the material using a first simulation technique, compare a vertical component of each of the first set of vertices to a lower limit for each of the first set of vertices, and for each vertical component that falls below the lower limit, modify the vertical component.

Another embodiment provides a memory storing an application of a type executed by a system that includes a processor, the application adapted to cause the processor to execute steps comprising: generating a first set of vertices for a material using a first simulation technique; comparing a vertical component of each of the first set of vertices to a lower limit for each of the first set of vertices; and for each vertical component that falls below the lower limit, modifying the vertical component.

In another embodiment, the present invention advantageously addresses the needs above as well as other needs by providing a method for use in simulation of a material. The method comprises the steps of: generating a first set of vertices for the material using a cloth simulation technique; generating a second set of vertices for the material using a skin simulation technique; comparing one or more of the first set of vertices to corresponding vertices in the second set of vertices; and modifying one or more of the first set of vertices if they deviate from the corresponding vertices in the second set of vertices by more than a certain amount.

Another embodiment of the present invention provides a system for use in simulation of a material. The system comprises: means for generating a first set of vertices for the material using a cloth simulation technique; means for generating a second set of vertices for the material using a skin simulation technique; means for comparing one or more of the first set of vertices to corresponding vertices in the second set of vertices; and means for modifying one or more of the first set of vertices if they deviate from the corresponding vertices in the second set of vertices by more than a certain amount.

Another embodiment of the present invention provides a method for use in simulation of a material. The method comprises the steps of: generating a first set of vertices for the material using a cloth simulation technique; comparing a vertical component of each of the first set of vertices to a lower limit for each of the first set of vertices; and for each vertical component that falls below its lower limit, modifying the vertical component to be equal to its lower limit.

And yet another embodiment of the present invention provides a system for use in simulation of a material. The system comprises: means for generating a first set of vertices for the material using a cloth simulation technique; means for comparing a vertical component of each of the first set of vertices to a lower limit for each of the first set of vertices; and means for modifying each vertical component that falls below its lower limit to be equal to its lower limit.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION

It has been found by the inventor hereof that the above-mentioned Verlet integration scheme for cloth simulation, which may also be referred to herein as the Verlet cloth simulator, has a number of disadvantages. Such disadvantages become apparent when the Verlet integration scheme is used for simulating clothing on an animated character. For example, unpredictable results sometimes occur such that the clothing bunches up in unwanted areas, stretches too much, or becomes too far removed from the animated character's body. Sometimes the clothing can even completely "pass through" the animated character's body.

Embodiments of the present invention help to overcome these and other disadvantages by providing several techniques that may be used in the simulation and/or movement of cloth and/or other materials. Such techniques can be used in many different types of computer graphics and animation applications, such as for example graphics workstations and video game applications of the type executed by video game consoles and devices such as the popular Sony PlayStation® and PlayStation® 2.

The techniques described herein provide several novel constraint systems for use in the real-time simulation and/or movement of materials such as cloth, clothing (e.g. shirts, shorts, other garments, etc.), hair, fur, flags, etc. The techniques can be used with any existing or forthcoming material simulation technique, such as the Verlet integration scheme mentioned above. The several novel constraints employed by the techniques described herein improve the quality of cloth simulation and help to effectively control the cloth simulation. Furthermore, the techniques may be run on graphics systems which may not have random-access to main memory. Thus, once the graphics system is preloaded with the data needed, the techniques can be applied, and persistent data saved out. And the simulation may be run concurrently with other graphics tasks. On a multi processing core, the simulation can be executed on a separate processor.

In the following discussion the techniques are described in connection with a video game having one or more animated players, such as for example a basketball video game. The clothing that a player in the basketball game typically wears comprises a shirt or jersey and a pair of shorts. Cloth simulation techniques are preferably used to make the player's clothing look as realistic as possible. While embodiments of the present invention are described herein with respect to a player in a basketball video game, it should be well understood that there are numerous other types of games and animations to which embodiments of the present invention may be used and applied, such as for example other types of video games, movies, videos, animations, cartoons, etc.

By way of example, the systems described herein may be built using a number of spheres to represent a player body. The spheres may be enveloped with simulated skin using any known skin simulation technique, which is sometimes referred to as skinning. The spheres then move with the movement of the player skin. Clothing may be simulated using well-known triangle mesh techniques.

Figure 1:
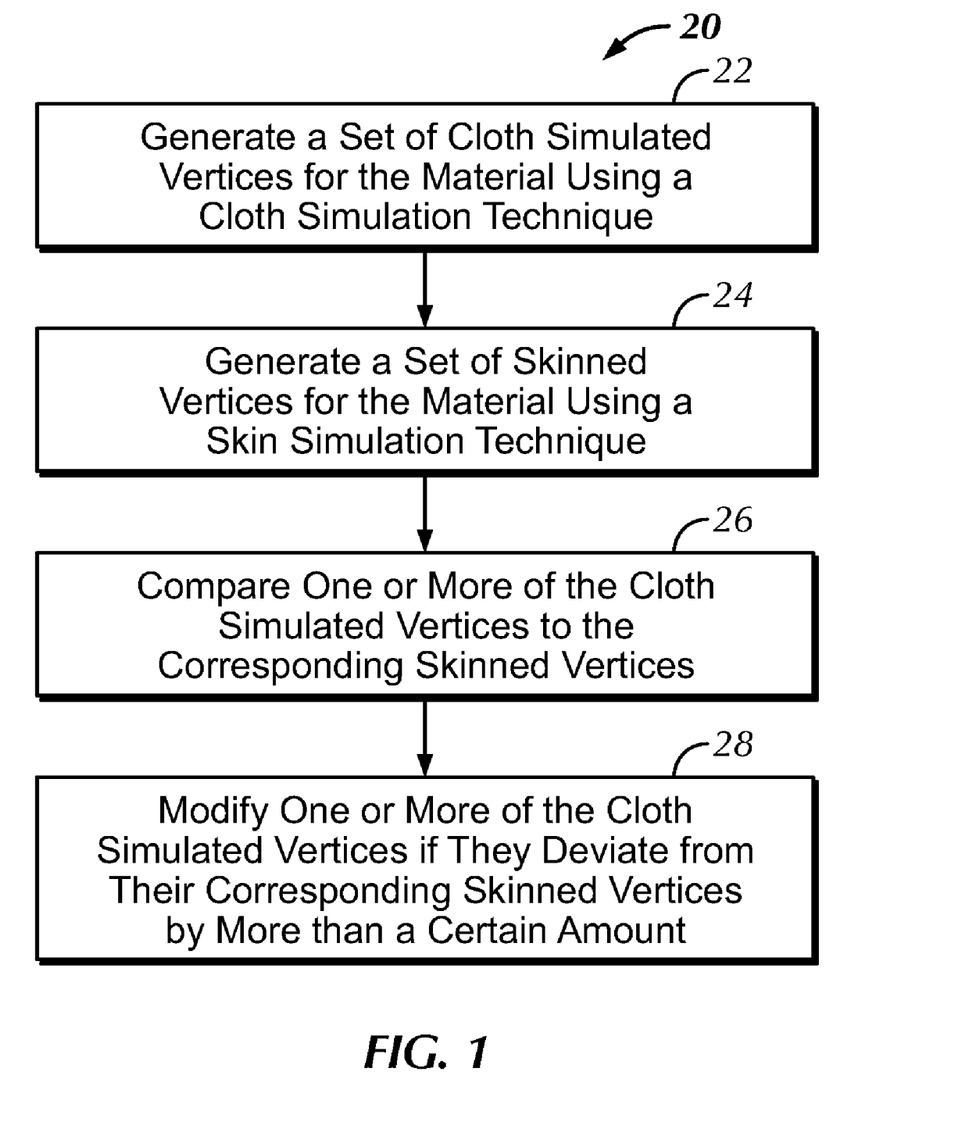
FIG. 1 is a flow diagram illustrating a method for use in the simulation of a material in accordance with an embodiment of the present invention.

Referring to FIG. 1, there is illustrated a method that operates in accordance with an embodiment of the present invention. The method 20 may be used in the simulation of a material, such as clothing or any of the other materials mentioned above. In general, the method 20 uses skinned vertices as a constraint on the simulated cloth to help prevent the vertices of the simulated cloth from moving too far away from their resting position. This helps control the cloth and prevents it from bunching up in unwanted areas.

Turning to the specific steps of the method 20, in step 22 a first set of vertices are generated for the material to be simulated, such as an item of clothing or other garment, using a cloth simulation technique. This first set of vertices may be referred to as the cloth simulated vertices. Any type of cloth simulation technique may be used, such as the Verlet integration scheme mentioned above. In step 24 a second set of vertices for the material are generated using a skin simulation technique. This second set of vertices may be referred to as the skinned vertices. Any type of skin simulation technique may be used, many of which are known in the art.

Figure 2A:
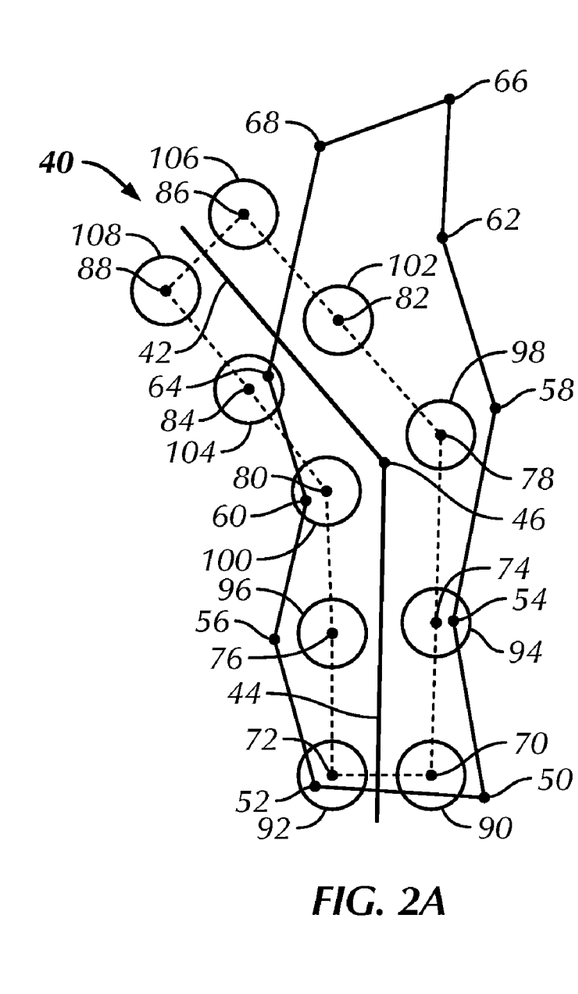
FIGS. 2A and 2B are pictorial diagrams illustrating an example application of the method shown in FIG. 1 in accordance with an embodiment of the present invention.

An example of steps 22 and 24 is illustrated in FIG. 2A, which illustrates an example application of the method 20. In this example a portion of a player's arm or other limb 40 is shown, which comprises two rigid member (e.g. bone) sections 42, 44 connected by a joint 46. Pursuant to step 22 (FIG. 1) a set of cloth simulated vertices 50, 52, 54, 56, 58, 60, 62, 64, 66, 68 for the player's jersey are generated using a cloth simulation technique. Then, pursuant to step 24 a set of skinned vertices 70, 72, 74, 76, 78, 80, 82, 84, 86, 88 for the player's jersey are generated using a skin simulation technique.

The set of cloth simulated vertices and the set of skinned vertices may be generated from the same original set of vertices, which represent the cloth or other material. Thus, in this example the cloth simulated vertices and skinned vertices are generated from the same original positions and topology. By way of example, the cloth may be modeled in a modeling package as a triangle mesh and exported to the simulation where the method 20 (FIG. 1) is performed.

It is noted that FIG. 2A (and FIG. 2B) are simplified in that the triangle mesh structure of the cloth is not shown and only a small number of vertices are shown. It should be well understood that this simplification is for assisting the reader's understanding and that in an actual application numerous vertices in a triangle mesh structure will exist.

As shown some of the cloth simulated vertices 58, 62, 66, 68 are too far removed from the bone section 42 such that the bone section 42 has "passed through" the cloth. This is a common problem with conventional cloth simulation techniques. In contrast, the corresponding skinned vertices 78, 82, 86, 88 are much closer to the bone section 42 and follow the bone section 42 in a tighter manner.

In order to constrain and adjust the cloth simulated vertices the remaining steps of the method 20 (FIG. 1) are performed. Namely, in step 26 one or more of the cloth simulated vertices are compared to the corresponding skinned vertices. Then, in step 28 one or more of the cloth simulated vertices are modified if they deviate from their corresponding skinned vertices by more than a certain amount. By way of example, the certain amount of deviation may comprise a predetermined maximum radius around each skinned vertex. As such, the cloth simulated vertices may be modified to have a position falling within the predetermined maximum radius around each corresponding skinned vertex.

An example of step 26 is illustrated in FIG. 2A. Namely, the positions of the cloth simulated vertices 50, 52, 54, 56, 58, 60, 62, 64, 66, 68 are compared to the positions of their corresponding skinned vertices 70, 72, 74, 76, 78, 80, 82, 84, 86, 88. A determination is made as to whether the position of each cloth simulated vertex deviates from the position of its corresponding skinned vertex by more than a predetermined maximum radius 90, 92, 94, 96, 98, 100, 102, 104, 106, 108 around the skinned vertex. The radius 90, 92, 94, 96, 98, 100, 102, 104, 106, 108 may all be equal to each other, or all different, or some equal and some different.

Figure 2B:
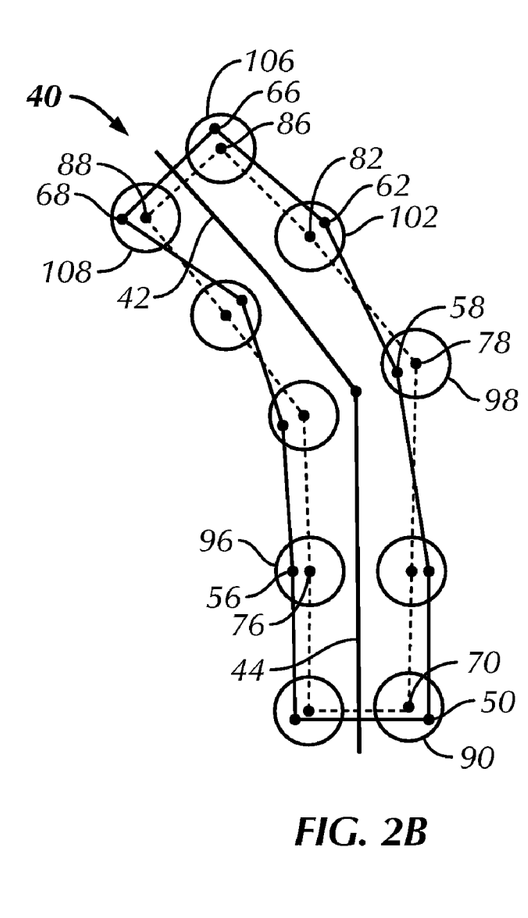

An example of step 28 is illustrated in FIG. 2B. As shown, the position of each cloth simulated vertex 50, 56, 58, 62, 66, 68 that does deviate beyond the predetermined maximum radius 90, 96, 98, 102, 106, 108 around its corresponding skinned vertex 70, 76, 78, 82, 86, 88 is modified to be within the predetermined maximum radius. In this way the skinned vertices are used as a constraint, such that the cloth simulated vertices will never move farther away from the skinned vertices than a user-defined distance. This helps to prevent clothing from bunching up in unwanted places or clothing passing through the player's body. Because the skinned vertices are used as a constraint, they are generally not rendered on the display screen.

Figure 3A:
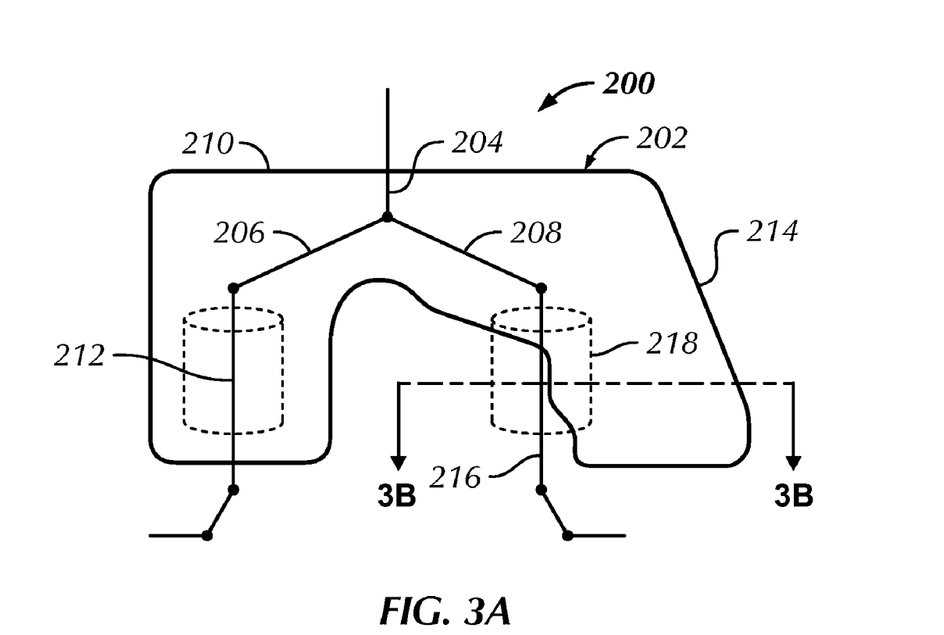
FIGS. 3A, 3B and 3C are pictorial diagrams illustrating another example application of the method shown in FIG. 1 in accordance with an embodiment of the present invention.
Figure 3B:
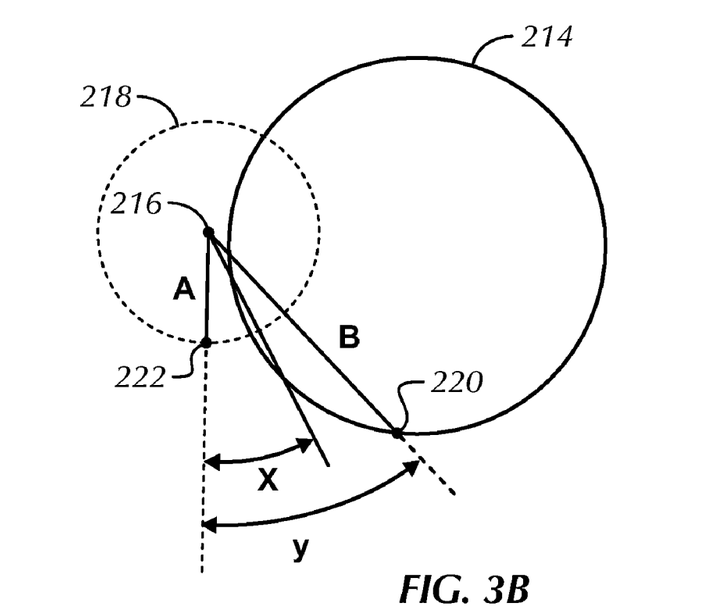
Figure 3C:
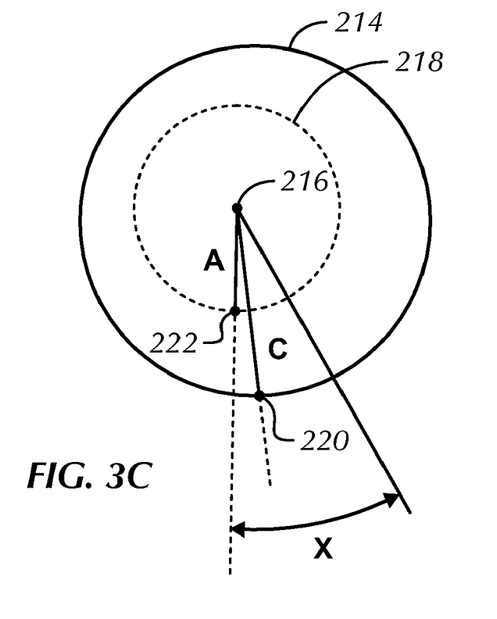

Another example application of the method 20 (FIG. 1) is shown in FIGS. 3A, 3B and 3C. Specifically, FIG. 3A illustrates a portion of a basketball player 200 wearing a pair of shorts 202. The shorts 202 cover a portion of the player's spine 204 and hip bones 206, 208. Furthermore, a first leg portion 210 of the shorts 202 covers one of the player's leg bones 212, and a second leg portion 214 of the shorts 202 is supposed to cover the player's other leg bone 216.

As shown, however, the player's leg bone 216 has passed through the second leg portion 214 of the shorts 202. As mentioned above, such "pass through" and the bunching up of clothing in unwanted areas is a common problem with conventional cloth simulation techniques. Cloth such as pants and shorts has a tendency to "pass through" the collision object at high speeds due to the discrete nature of cloth simulation.

The method 20 (FIG. 1) can be used to modify one or more of the cloth simulated vertices of the second leg portion 214 to correct this unwanted "pass through." Specifically, in step 22 a set of cloth simulated vertices for the second leg portion 214 of the player's shorts 202 are generated using a cloth simulation technique. Then, in step 24 a set of skinned vertices 218 for the second leg portion 214 of the player's shorts 202 are generated using a skin simulation technique.

FIG. 3B is a cross-sectional view of the player's shorts 202 and leg bone 216 taken along line 3B-3B in FIG. 3A. As shown, the leg bone 216 falls within the skinned vertices 218, whereas the leg bone 216 falls outside of the cloth simulated vertices 214 due to "pass through." In step 26 of the method 20 (FIG. 1) one or more of the cloth simulated vertices are compared to the corresponding skinned vertices. For example, the cloth simulated vertex 220 is compared to its corresponding skinned vertex 222. In step 28, if the cloth simulated vertex 220 deviates from its corresponding skinned vertex 222 by more than a certain amount, then the cloth simulated vertex 220 is modified.

In the example embodiment described above with respect to FIGS. 2A and 2B, the certain amount of deviation comprised a predetermined maximum radius around each skinned vertex. In the embodiment shown in FIGS. 3A, 3B and 3C, however, the certain amount of deviation is based on axial constraints. In general, an axial constraint limits the movement of the cloth simulated vertices by limiting the angle between the skinned vertex and the center of the leg, and the cloth simulated vertex and the center of the leg. Such axial constraints can help to prevent the "pass through" problem.

FIGS. 3B and 3C illustrate an example of the use of axial constraints. Specifically, the certain amount of deviation that is allowed in this example comprises a predetermined maximum angle x between a first line A from the bone 216 to the skinned vertex 222 and a second line B from the bone 216 to the corresponding cloth simulated vertex 220. That is, the cloth simulated vertex 220 deviates from its corresponding skinned vertex 222 by more than the certain amount if the angle y between lines A and B exceeds the predetermined maximum angle x. As shown, if the predetermined maximum angle that is permitted is x, then the present angle of y between lines A and B (which is larger than angle x) exceeds the permitted certain amount of deviation.

Because in FIG. 3B the cloth simulated vertex 220 does deviate from its corresponding skinned vertex 222 by more than the certain amount, the cloth simulated vertex 220 is modified as shown in FIG. 3C. Specifically, the position of the cloth simulated vertex 220 is modified so that the predetermined maximum angle x is not exceeded. By modifying the positions of the cloth simulated vertices for the second leg portion 214 so that the predetermined maximum angle x for each such vertex is not exceeded, the second leg portion 214 of the player's shorts 202 is repositioned. The result is that the bone 216 is within the second leg portion 214 and the "pass through" problem is corrected.

In addition, the final length of the line C from the bone 216 to the modified cloth simulated vertex 220 shown in FIG. 3C may also be adjusted. It has been found that the following equations provide a suitable length for the line C:

$$C = At + (1-t)B \quad (1)$$

where, $$t = x/y \quad (2)$$

Thus, the final distance from the bone 216 to the rotated cloth simulated vertex 220 may optionally be adjusted using these equations.

Thus, the use of axial constraints is a fast technique for controlling the movement of cloth and preventing movement of the cloth through the collision model at fast animation speeds. In the illustrated examples the axial constraint angles are measured from the bone 216, but is should be understood that the axial constraint angles may be measured from other points or other rigid members and that such points do not have to be in the center of the skinned vertices 218 as shown.

Figure 4:
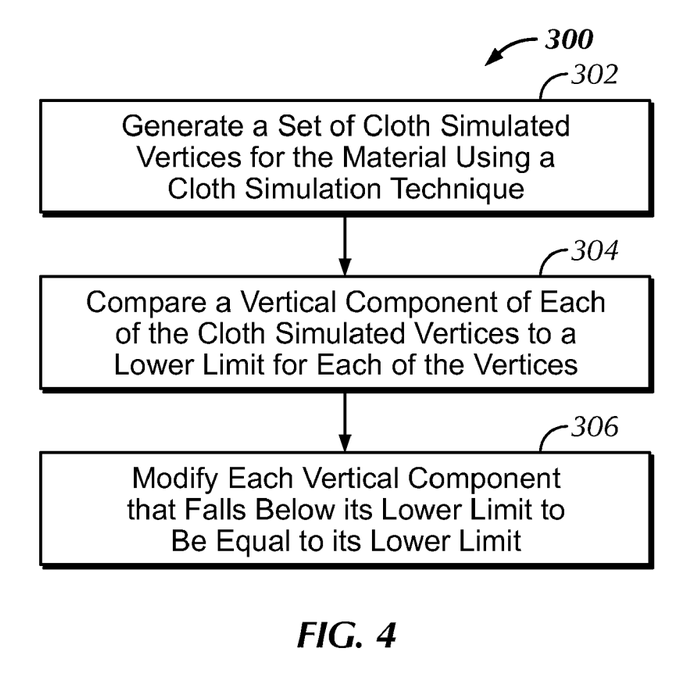
FIG. 4 is a flow diagram illustrating another method for use in the simulation of a material in accordance with an embodiment of the present invention.

Referring to FIG. 4, there is illustrated a method 300 that operates in accordance with another embodiment of the present invention. The method 300 may also be used in the simulation of a material, such as clothing or any of the other materials mentioned above. In general, the method 300 uses vertical constraints to help prevent the excessive stretching of cloth, such as for example due to gravity. By way of example, the method 300 can be used to help hold up the shoulders on clothing such as a basketball jersey.

Turning to the specific steps of the method 300, in step 302 a set of cloth simulated vertices are generated for the material, such as an item of clothing or other garment, using a cloth simulation technique. As with the method discussed above, any type of cloth simulation technique may be used, such as the Verlet integration scheme mentioned above. In step 304 a vertical component of each of the cloth simulated vertices is compared to a lower limit for each of the vertices. In step 306, each vertical component that falls below its lower limit is modified to be equal to its lower limit. This prevents cloth from excessive stretching due to gravity because the vertical component of the cloth simulated vertices is prevented from falling below a certain point.

Figure 5A:
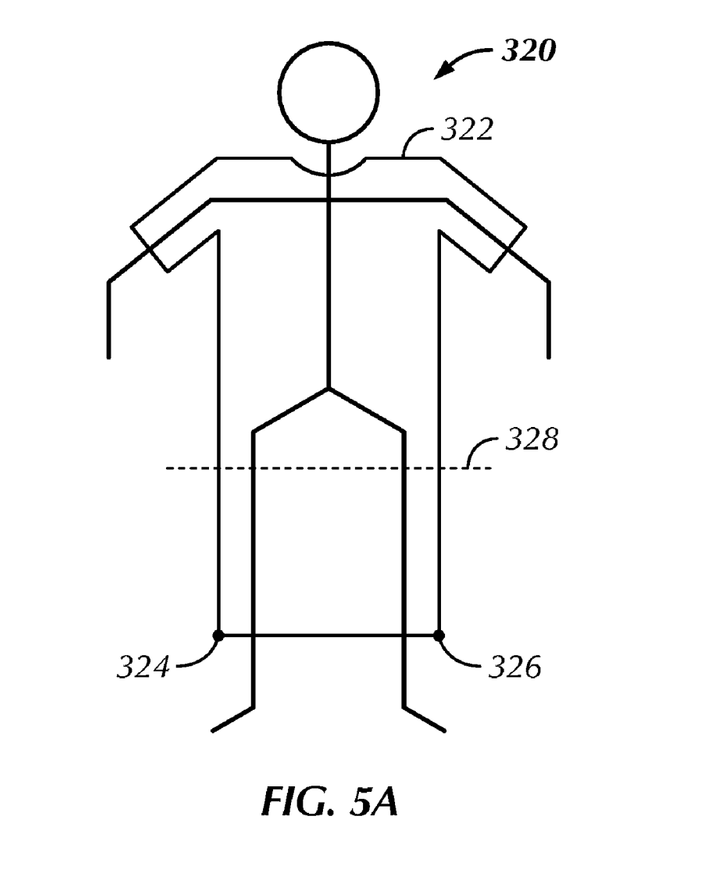
FIGS. 5A and 5B are pictorial diagrams illustrating an example application of the method shown in FIG. 4 in accordance with an embodiment of the present invention.
Figure 5B:
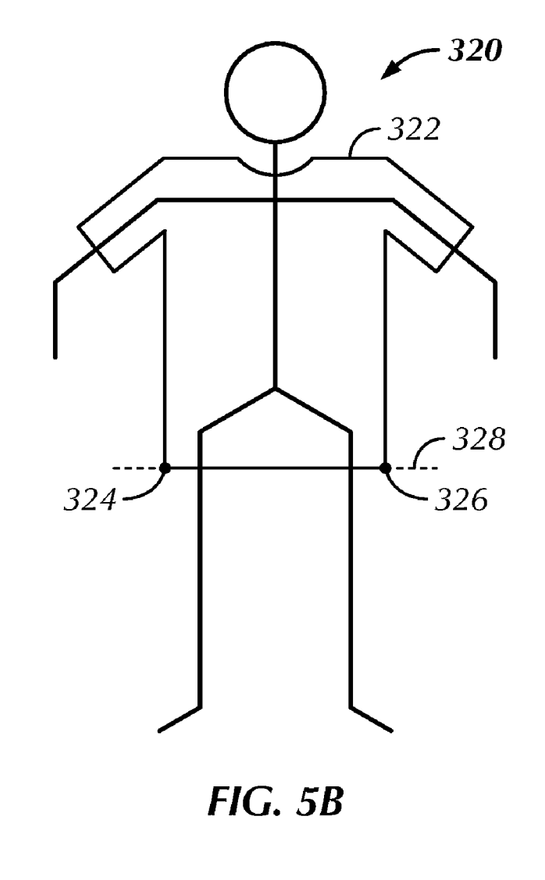

An example of an application of the method 300 is illustrated in FIGS. 5A and 5B. This example shows an animated player 320 wearing a jersey 322. According to step 302 of the method 300 (FIG. 4), a set of cloth simulated vertices are generated for the jersey using a cloth simulation technique. Two of these vertices 324, 326 are shown in FIG. 5A. As illustrated the jersey has stretched excessively all the way to the player 320's ankles. This is a common problem with conventional cloth simulation techniques in that they can exhibit stretching due to gravity forces applied to each particle.

In order to correct this stretching problem a vertical component of each of the cloth simulated vertices 324, 326 is compared to a lower limit 328 for each of the vertices 324, 326, pursuant to step 304 of the method 300 (FIG. 4). As shown in FIG. 5A the vertical component of each of the cloth simulated vertices 324, 326 falls well below the lower limit 328 such that correction is needed.

An example of step 306 of the method 300 (FIG. 4) is shown in FIG. 5B. Specifically, the vertical component of each of the cloth simulated vertices 324, 326 is modified to be equal to the lower limit 328. When this procedure is applied to all of the vertices of the jersey 322 that fall below their respective lower limits, the length of the jersey 322 is made shorter so that it hangs at about the player 320's hips as shown in FIG. 5B.

In one embodiment, the vertical constraints employed by the method 300 (FIG. 4) work by modeling the cloth in its default resting position, and then creating a constraint, per vertex, which prevents the cloth from falling below its original height position. By way of example, the value of the lower limits can be determined by using skin simulation techniques. Namely, a set of skinned vertices for the jersey can be generated, and then the lower limit for each cloth simulated vertex can be set equal to the vertical component of its corresponding skinned vertex. And when the body moves, these vertical constraints can then be transformed by character skinning techniques to match the movement of the body. Thus, in this example the lower limit uses the position of the skinned vertex, which means as the body moves, the lower limit moves. It should be well understood, however, that the lower limits may be generated in many other different ways. For example, the lower limits may each be set equal to a predetermined value or some other value.

Figure 6:
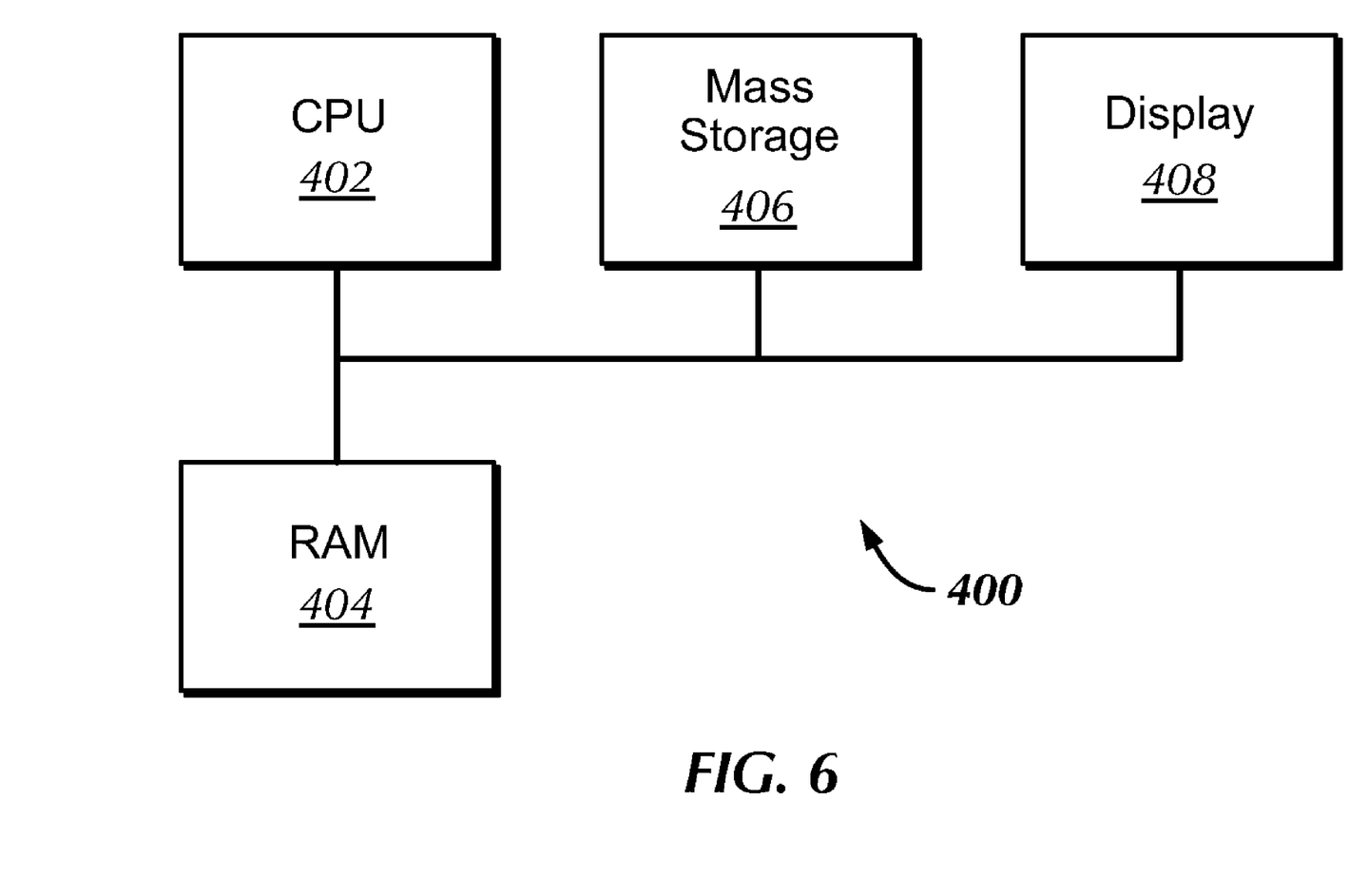
FIG. 6 is a block diagram illustrating a system that may be used to run and execute the methods shown in FIGS. 1 and 4 in accordance with embodiments of the present invention.

As mentioned above, the methods and techniques described herein may be utilized and run on many different types of computers, graphics workstations, video game systems and consoles, and the like. Referring to FIG. 6 there is illustrated such a system 400 that may be used to run the methods and techniques described herein. The system 400 includes a central processing unit (CPU) 402, a random access memory (RAM) 404, a mass storage unit 406, such as a disk drive, and a display monitor 408. The CPU 402 can be used to execute the steps of the methods and techniques described herein, and the materials that are simulated can be rendered on the display monitor 408. And as mentioned above, the simulation may be run concurrently with other graphics tasks. On a multi processing core, the simulation can be executed on a separate processor.

While the invention herein disclosed has been described by means of specific embodiments and applications thereof, numerous modifications and variations could be made thereto by those skilled in the art without departing from the scope of the invention set forth in the claims.

What is claimed is:

1. A method for use in simulation of a material, comprising:
   generating, using a processor based apparatus, a first set of vertices for the material using a cloth simulation technique; and
   using skinned vertices as a constraint on the first set of vertices for the material, wherein using skinned vertices as a constraint on the first set of vertices for the material comprises modifying one or more of the first set of vertices if the one or more of the first set of vertices deviate from corresponding vertices in the skinned vertices by more than a certain amount.

2. The method of claim 1, wherein using skinned vertices as a constraint on the first set of vertices for the material comprises:
   generating a second set of vertices for the material using a skin simulation technique.

3. The method of claim 1, wherein using skinned vertices as a constraint on the first set of vertices for the material comprises:
   comparing one or more of the first set of vertices to corresponding vertices in the skinned vertices.

4. The method of claim 1, wherein using skinned vertices as a constraint on the first set of vertices for the material comprises:
   modifying one or more of the first set of vertices to have a value within a predetermined maximum radius around each corresponding vertex in the skinned vertices.

5. The method of claim 1, wherein using skinned vertices as a constraint on the first set of vertices for the material comprises:
   defining an independent radius around each of the skinned vertices that have corresponding vertices from the first set of vertices; and
   determining, for each of the skinned vertices that have corresponding vertices from the first set of vertices, whether a corresponding vertex from the first set of vertices is further away from the corresponding skinned vertex than the corresponding radius of the corresponding skinned vertex; and
   implementing the modifying the one or more of the first set of vertices for each vertex of the first set of vertices that is further away from the corresponding skinned vertex than the corresponding radius of the corresponding skinned vertex.

6. The method of claim 5, wherein the modifying the one or more of the first set of vertices comprises:
   modifying each vertex of the first set of vertices that is further away from the corresponding skinned vertex than the corresponding radius to be within the corresponding radius of the corresponding skinned vertex.

7. The method of claim 6, wherein each of the independent radii are user defined distances.

8. The method of claim 6, wherein the defining the independent radii around each of the skinned vertices that have corresponding vertices from the first set of vertices comprises:
   defining a first radius for a corresponding first skinned vertex of the skinned vertices with a first distance; and
   defining a second radius for a corresponding second skinned vertex of the skinned vertices with a second distance, where the first distance is different than a second distance.

9. The method of claim 6, wherein the defining the independent radii around each of the skinned vertices that have corresponding vertices from the first set of vertices comprises:
   defining a first plurality of radii for a corresponding first plurality of the skinned vertices with a first distance; and
   defining a second plurality of radii for a corresponding second plurality of the skinned vertices with a second distance, where the first distance is different than a second distance.

10. A method for use in simulation of a material, comprising:
    generating, using a processor based apparatus, a first set of vertices for the material using a cloth simulation technique; and
    using skinned vertices as a constraint on the first set of vertices for the material, wherein using skinned vertices as a constraint on the first set of vertices for the material comprises:
    limiting an angle formed between a first one of the skinned vertices and a point, and a corresponding one of the first set of vertices and the point.

11. The method of claim 10, further comprising:
    identifying a first line between the first one of the skinned vertices and the point;
    identifying a second line between the point and the corresponding one of the first set of vertices;
    determining an initial angle defined between the first line and the second line;
    determining whether the initial angle is greater than a predefined angle; and
    implementing the limiting of the angle, comprising modifying a position of the corresponding one of the first set of vertices such that the angle is reduced to be less than the predefined angle, where the reduced angle is defined between the first line and a modified second line defined between the point and the modified position of the corresponding one of the first set of vertices.

12. The method of claim 11, wherein the modifying the position of the corresponding one of the first set of vertices further comprises modifying the position of the corresponding one of the first set of vertices such that a length of the modified second line is different than a length of the second line.

13. The method of claim 12, wherein the modifying the position of the corresponding one of the first set of vertices further comprises the modifying the position of the corresponding one of the first set of vertices such that the length of the modified second line is set equal to about $(At+(1-t)B)$, where A is the length of the first line, B is the length of the second line, and t is the predefined angle divided by the initial angle.

14. The method of claim 10, further comprising:
    generating the skinned vertices and the first set of vertices from an original set of vertices, where the point is one of the original set of vertices.

15. A system, comprising:
a processing unit;
a memory coupled to the processing unit; and
a display coupled to the processing unit;
wherein the processing unit, memory, and display are configured to:
simulate a material;
generate a first set of vertices for the material using a cloth simulation technique and use skinned vertices as a constraint on the first set of vertices for the material; and
modify one or more of the first set of vertices if the one or more of the first set of vertices deviate from corresponding vertices in the skinned vertices by more than a certain amount.

16. The system of claim 15, wherein the processing unit, memory, and display are further configured to modify one or more of the first set of vertices to have a value within a predetermined maximum radius around each corresponding vertex in the skinned vertices.

17. A system, comprising:
a processing unit;
a memory coupled to the processing unit; and
a display coupled to the processing unit;
wherein the processing unit, memory, and display are configured to simulate a material and are further configured to generate a first set of vertices for the material using a cloth simulation technique and use skinned vertices as a constraint on the first set of vertices for the material, and
wherein the processing unit, memory, and display are further configured to limit an angle formed between a first one of the skinned vertices and a point, and a corresponding one of the first set of vertices and the point.

18. A memory storing an application of a type executed by a system that includes a processor, the application adapted to cause the processor to execute steps comprising:
generating a first set of vertices for a material using a cloth simulation technique; and
using skinned vertices as a constraint on the first set of vertices for the material;
wherein the step of using skinned vertices as a constraint on the first set of vertices for the material comprises modifying one or more of the first set of vertices if the one or more of the first set of vertices deviate from corresponding vertices in the skinned vertices by more than a certain amount.

19. The memory of claim 18, wherein the step of using skinned vertices as a constraint on the first set of vertices for the material comprises:
modifying one or more of the first set of vertices to have a value within a predetermined maximum radius around each corresponding vertex in the skinned vertices.

20. A memory storing an application of a type executed by a system that includes a processor, the application adapted to cause the processor to execute steps comprising:
generating a first set of vertices for a material using a cloth simulation technique; and
using skinned vertices as a constraint on the first set of vertices for the material, wherein the step of using skinned vertices as a constraint on the first set of vertices for the material comprises:
limiting an angle formed between a first one of the skinned vertices and a point, and a corresponding one of the first set of vertices and the point.

* * * * *